United States Patent [19]

Basel

[11] Patent Number: 5,331,886
[45] Date of Patent: Jul. 26, 1994

[54] GRILL APPARATUS FOR REDUCING CARCINOGENS IN GRILLED FOODS

[76] Inventor: Richard M. Basel, 10760 W.C.R. 18, Fostoria, Ohio 44830

[21] Appl. No.: 865,225

[22] Filed: Apr. 8, 1992

[51] Int. Cl.⁵ ............................................. A47J 37/07
[52] U.S. Cl. ........................................ 99/446; 99/450; 99/482
[58] Field of Search ................ 99/401, 400, 375, 422, 99/425, 444–446, 447, 449, 450, 482; 126/25 R, 9 R

[56] References Cited

U.S. PATENT DOCUMENTS 4,909,137  3/1990  Brugnoli ............................. 99/444

FOREIGN PATENT DOCUMENTS 105758  10/1917  United Kingdom ................. 99/444

Primary Examiner—Timothy F. Simone

[57] ABSTRACT

The present invention relates to a process of preparing a safer form of grilled or flame-broiled foods by reducing the presence and formation of known and potential carcinogenic compounds in such foods without sacrificing the flavors and organoleptic properties normally associated with such food. The invention also relates to a grill apparatus for carrying out the grilling of such foods. Both the inventive grilling process and grill apparatus utilize a fractionating medium which is capable of separating the lower boiling point smoke compounds from the higher boiling point smoke compounds, allowing said lower boiling point flavor compounds to contact the food, while retaining said higher boiling point carcinogenic compounds and thereby preventing them from contacting the food.

9 Claims, 1 Drawing Sheet

GRILL APPARATUS FOR REDUCING CARCINOGENS IN GRILLED FOODS

This invention was made with government support under National Cancer Institute Grant No. CA-54039 awarded by the National Institutes of Health. The United States government has certain rights in the invention.

BACKGROUND OF THE INVENTION

1. Field of the Invention

The present invention relates to a process for preparing safer forms of grilled or flame-broiled foods by reducing the presence and formation of known and suspected carcinogenic compounds in such foods without sacrificing the flavors and organoleptic properties normally associated with such foods. The invention also relates to a grill apparatus for carrying out such a process.

The process and grill apparatus utilize a medium which is capable of separating or fractionating the desired lower boiling point flavor compounds from the undesired higher boiling point carcinogenic compounds due to the temperature differential of the medium. This medium, called a fractionating medium, allows the desired lower boiling point flavor compounds of the smoke produced during grilling to pass through the medium and contact the food, thereby giving it the characteristic grilled or smoked flavor. The higher boiling point carcinogenic compounds contained in the smoke, however, are retained on the fractionating medium, thereby preventing them from contacting the food. The resulting grilled food has the characteristic flavor and organoleptic properties of foods prepared by conventional grilling techniques, but contains reduced amounts of known or potential carcinogenic compounds.

Because of the satisfactory flavor, texture, appearance and other organoleptic properties associated with grilled and flame-broiled foods, they continue to be increasingly popular. Grilled foods have for many years found favor with individuals using small home-style grills and with commercial establishments such as restaurants.

Unfortunately, it is well known that grilled, flame-broiled and barbecued foods contain higher amounts of potential and known carcinogenic compounds than the same foods prepared by alternative cooking methods. For example, conventional grilling results in direct charting of foods and is a major cause of carcinogen formation in grilled foods. Since such foods are increasingly popular both at home and in restaurants, they may present an elevated health risk.

The formation of known and potential carcinogens is known to occur as a result of the cooking of foods. The quantity of these carcinogenic compounds in prepared foods can be traced to the type of cooking preparation method. For example, Lijinsk, W. and Shubik, P., 1964, Benzo(a)pyrene and Other Polynuclear Hydrocarbons in Charcoal-broiled Meat, Science, 145:53, reported the presence of benzo[a]pyrene (BaP) and related polynuclear aromatic hydrocarbons (PAH) in charcoal-broiled beef. They found that the crust of beef contained 8 to 50 micrograms of BaP/kg. Lintas et al., 1979, Determination of Benzo(a)pyrene in Smoked, Cooked and Roasted Food Products. *Food Cosmet. Toxicol.*, 17:325, on the other hand, found a much lower amount of BaP (0.05 micrograms of BaP/kg) in hamburger heated in a pan on an electric grill.

It is also known that the smoke produced during a conventional grilling process contains a variety of polynuclear aromatic hydrocarbons. For example, Lijinsk, W. and Shubik, P., 1964, Benzo(a)pyrene and Other Polynuclear Hydrocarbons in Charcoal-Broiled Meat, *Science* 145:53, found that a crust of beef, which consisted of the deposited smoke condensate, contained 8 to 50 micrograms of BaP/kg. Nagao et al., 1977, Mutagens in Foods and Especially Pyrolysis Products of Protein, *In Progress in Genetic Toxicology*, p. 259, Scott, D. Dridges, B.A., and Sobels, F.H. (Eds), Elsevier/North-Holland, Amsterdam, reported that the charred surface of beef (190 g) contained 860 micrograms of polynuclear aromatic hydrocarbons, with the smoke condensates having a much lower level of polynuclear aromatic hydrocarbons than the tars from the pyrolyzed amino acids.

According to some estimates approximately 40% of cancer incidence is due to food. Wynder, 1983, *Reflections on Diet, Nutrition and Cancer, Cancer Research*, 43: 3024. More recent studies have also come to a similar conclusion. Vuolo, L.L. & Schuessler, G.J., 1985, Putative Mutagens and Carcinogens in Foods. VI. Protein Pyrolyzate Products. *Environ. Mutagen*, 7:577–98. Consequently, there is an urgent need for better grilling technology and a safer means of preparing grilled and flame-broiled foods. The numerous prior art attempts to avoid the formation of known and potential carcinogens in cooked foods show the critical need for such technology.

The following recommendations have previously been proposed for reducing the formation of carcinogens in food products during cooking. Lijinsky, W. and Ross, A.E., 1967, *Food Cosmet. Toxicol.*, 5:343, found that the level of polynuclear aromatic hydrocarbons was influenced by the level of fat in meat and that reducing the amount of fat reduced the formation of polynuclear aromatic hydrocarbon products. Avoiding direct contact of the food with the flames and thereby preventing charring of the foods has also been recommended. Separating the foods from the heating source, such as cooking in a pan or a skillet, while preventing the direct charring of the meat, causes great changes in the flavor and character of the meat when compared to foods prepared by conventional grilling techniques. It has also been suggested to discard the fat from the food during cooking and to add artificial smoked flavor to the food product. None of the above-mentioned solutions is ideal since none of them renders a product having the character and properties of a conventionally grilled or flame-broiled food. Moreover, it is unlikely that the consuming public will use a grill that produces a food product having a radically altered flavor and appearance.

The present invention accomplishes the same objective of the prior art by lowering the amount of known and potential carcinogens in prepared foods, but does so in a completely different manner, and quite unexpectedly does so without sacrificing the desired flavor and organoleptic properties associated with grilled or flame-broiled foods.

OBJECTS OF THE INVENTION

It is an object of this invention to provide a safer means of grilling or flame-broiling foods by reducing the amount of known and potential carcinogenic compounds in such foods as compared to foods prepared by conventional grilling or flame-broiling techniques.

It is also an object of this invention to provide such safer means of grilling or flame-broiling foods without sacrificing the satisfactory flavor, texture, appearance and other organoleptic properties normally associated with grilled or flame-broiled foods.

A primary purpose of the present grilling process and grilling apparatus is to prepare grilled foods without charring the food. Preventing the charring of the food will reduce a considerable amount of the known and potential carcinogenic compounds that are formed by conventional grilling techniques, i.e., those that allow the food to become charred during preparation. It is recognized that direct contact of the flames creates a considerable amount of the known and potential carcinogenic compounds found in such foods. The reduction of this adverse problem would lead to a safer food. The fractionating medium of this invention prevents the flames from contacting the food and thereby prevents charring.

Along with the reduction in carcinogenic compounds caused by charring, another primary purpose of the present invention is the preparation of foods having the same characteristic grilled or smoked flavor of foods prepared by conventional grilling techniques.

This is accomplished by allowing the drippings or juices from the heated food product to be charred by the heating source (either by direct contact with the heating source or by indirect contact with the heat produced by such heating source) to produce a smoking effect. The drippings or juices percolate through the fractionating medium and contact the heating source creating the smoking effect. The smoke is then separated into fractions by the fractionating medium, with the lower boiling point flavor compounds passing through the medium, contacting the food and thereby giving it the characteristic grilled or smoked flavor which is necessary for organoleptic acceptance by the consumer.

Another primary purpose of the present invention is to reduce the amount of known and potential carcinogenic compounds contained in the smoke from contacting the food product. This is accomplished by the fractionating medium which is capable of separating the desired lower boiling point flavor compounds from the undesired higher boiling point carcinogenic compounds contained in the smoke. Due to the temperature differential across the fractionating medium, the desired lower boiling point flavor compounds pass through the medium and contact the food, thereby giving it the characteristic grilled or smoked flavor. The higher boiling point carcinogenic compounds, such as the polynuclear aromatic hydrocarbons, however, do not pass through the fractionating medium, but instead are retained on the medium, and thereby are prevented from contacting the food. The resulting grilled food has the characteristic flavor and organoleptic properties of foods prepared by conventional grilling techniques, but contains reduced amounts of carcinogenic compounds. These and other objects can be readily observed from the following disclosure.

SUMMARY OF THE INVENTION

In the process embodiment, this invention relates to a process for preparing grilled food wherein the food is physically separated from a heating source by a fractionating medium which (i) prevents flames from said heating source from contacting said food, (ii) allows drippings from the food to pass through said fractionating medium, contact said heating source and produce smoke compounds, and (iii) separates said smoke compounds on the basis of boiling point.

In the grill apparatus embodiment, this invention relates to a grill apparatus comprising: (a) a grill for supporting food, (b) a heating source, and (c) a fractionating medium, located below said grill and above said heating source, which (i) prevents flames from said heating source from contacting said grill, (ii) allows drippings from the food supported on said grill to pass through said fractionating medium, contact said heating source and produce smoke compounds, and (iii) separates said smoke compounds on the basis of boiling point.

In still further embodiments, the fractionating medium of the above-mentioned process and grill apparatus is capable of (i) separating lower boiling point smoke compounds from higher boiling point smoke compounds, (ii) allowing said lower boiling point smoke compounds to contact the food supported on the grill, and (iii) retaining said higher boiling point smoke compounds, thereby preventing them from contacting said food.

In still further embodiments, the present invention relates to a process for preparing smoked food comprising: (a) a curing zone wherein said food is cured, (b) a fractionating medium, and (c) a smoking zone wherein smoke is produced. The curing zone is physically separated from the smoking zone by the fractionating medium, which is capable of separating the smoke compounds produced in the smoking zone on the basis of boiling point.

It has been found that, after monitoring by bioassay and chemical analyses to quantitate the presence and amount of known and potential carcinogenic compounds, foods, in particular hamburg and chicken, prepared according to the claimed invention, contained reduced amounts of these carcinogenic compounds as compared to foods prepared by conventional grilling.

It has also been found that, by taste panel testing, the flavor, texture, appearance and other organoleptic properties of foods, in particular hamburg and chicken, prepared by the process of the claimed invention, compared favorably with the same foods prepared by conventional grilling.

DESCRIPTION OF THE PREFERRED EMBODIMENTS

Figure 1:
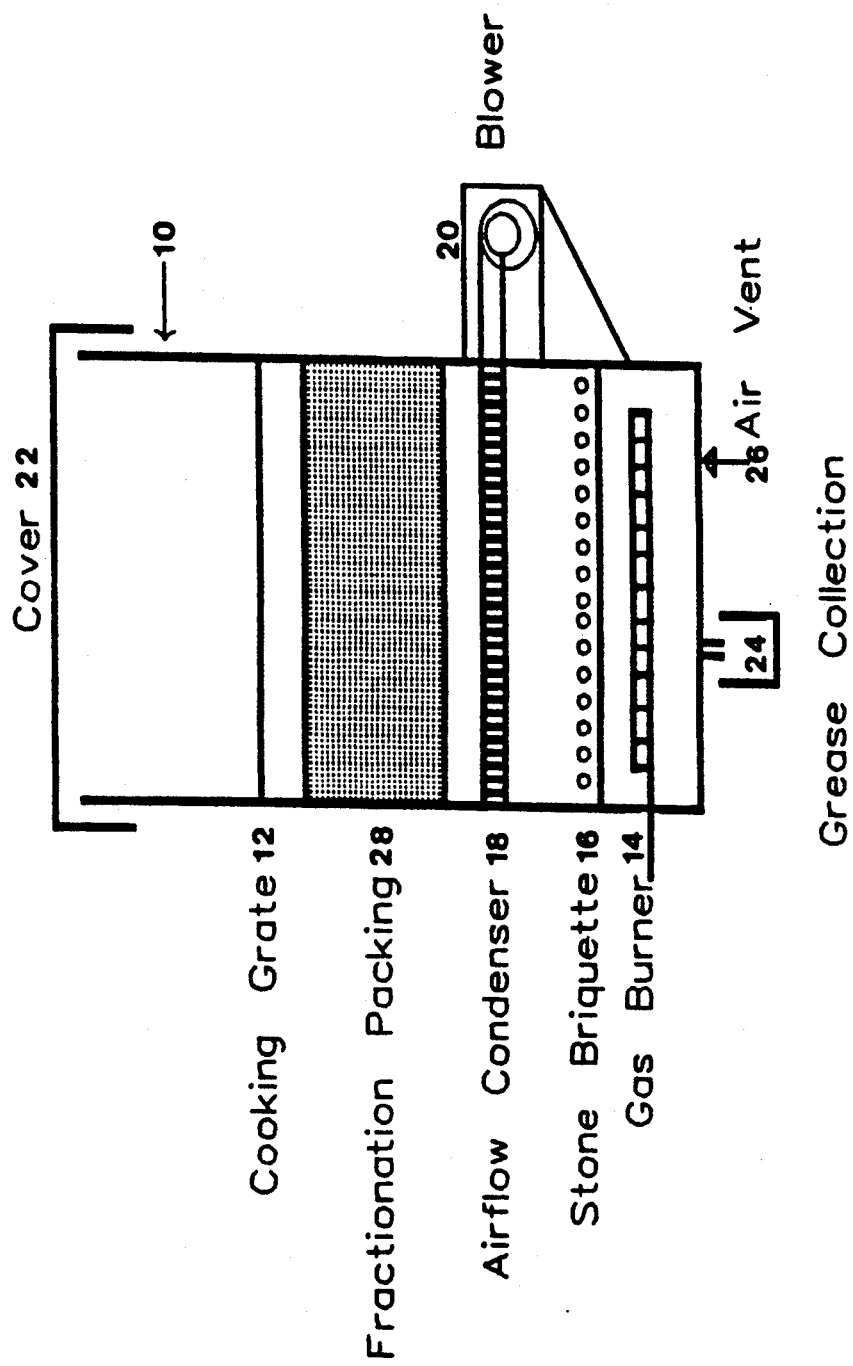
FIG. 1 is a schematic diagram of a grill equipped with a fractionating medium in accordance with the present invention.

To carry out the present invention, conventional grilling and flame-broiling equipment, as described below, can be employed. The fractionating medium, which is the inventive concept of this invention, can be any material capable of fractionating or separating the desired lower boiling point flavor compounds from the undesired higher boiling point carcinogenic compounds in the smoke. The fractionating medium also prevents the flames of the heating source from directly contacting the food product. Such direct contact can be further prevented by any type of screening device.

A necessary characteristic of the material used as the fractionating medium is the ability to withstand the temperatures of the heating source. Therefore, a fractionating medium constructed from metal, glass or porcelain is particularly preferred because such materials can withstand cooking temperatures.

The fractionating medium when placed between the food to be cooked and the heating source must also fractionate or separate the smoke compounds on the basis of boiling point. Materials such as those typically used for the fractional distillation of chemicals can be employed to accomplish the objectives of this invention. These materials include woven wire mesh packing, mesh packing, fiber bed packing, vertical flow sheet packing, metal ring packing, shaped packing, hell grid packing, inclined film packing, raschig ring packing, ellipsoids packing, berl saddles, pyrm rings and perforated plates. Such materials are commercially available from such companies as Otto H. York, Glitsch, Inc., Fluid Dynamic, Hydraulic Research, E.R. Wagner Manufacturing Co., Nutter Engineering and Norton Chemical Process Products.

The creation of a temperature differential across the fractionating medium is important to achieve the desired separation of the smoke compounds. Various polynuclear aromatic hydrocarbons, such as benza(a)anthracene and benzo(a)pyrene, have boiling points of 438° C. and 495° C., respectively. Various flavor compounds have boiling points as follows: o-cresol (191° C.), p-cresol (202° C.), 2,6 dimethoxyphenol (261° C.), p-ethylphenol (219° C.), and guiacol (o-methoxyphenol) (205° C.). Because of these differences in boiling points, the temperature differential across the fractionating medium should be such that a maximum amount of known and potential carcinogenic compounds, i.e., the higher boiling point compounds in the smoke, will be retained on the fractionating medium, while at the same time, a maximum amount of the lower boiling point flavor compounds in the smoke will pass through the fractionating medium and contact the food. According to the literature, cooking at temperatures below about 200° C. prevents the development of high levels of carcinogens. Therefore to reduce the presence and formation of carcinogens in the present invention, it is preferred that the temperature of the prepared food not exceed 220° C.

Depending on the type of material used for the fractionating medium, different thicknesses may be required to accomplish the intended objectives. The thickness of the fractionating medium will depend on the temperature differential created across the medium. Depending on the material used and the temperature of the heating source, the thickness should be adjusted so that the temperature differential allows the desirable flavor compounds to enter the cooking zone and contact the food, while the undesirable higher boiling point carcinogenic compounds are retained on the fractionating medium or remain in the smoke producing zone. For home-style grills such as described below, the preferred thickness of the fractionating medium is between about 2 and about 12 inches.

In conventional grilling, there is only one zone in which the food is cooked. In the present invention, at least two zones are created. In the cooking zone, the food is physically separated from the heating source by the fractionating medium. In the second or smoke producing zone, the food drippings or juices are charred to create the smoking effect. This smoke producing zone is physically separated from the cooking zone by the fractionating medium. The cooking zone because of its distance from the heating source and the presence of the fractionating medium is at a lower temperature than the smoke producing zone. This allows foods to be cooked at lower and hence safer temperatures. The smoke producing zone is similar to that in a conventional grill in that the food drippings or juices make their way to this area and are exposed either to direct flame contact or temperatures of approximately 500° C. or greater. In order to reduce the presence and formation of carcinogens in the prepared food, it is preferred that the temperature in the cooking zone not exceed about 220° C.

As stated above, the present invention can be carried out using conventional grilling equipment modified to include the fractionating medium. FIG. 1 shows a typical conventional grill 10 including a grilling surface 12 or cooking grate, a heating source 14 and stone briquettes 16. The grilling surface functions to support the food product during the cooking process. The heating source is not critical and consists of anything from charcoal or wood to a burner connected to a gas supply. Heating sources are well known and conventional in the art and any of those conventional heating sources can be used to accomplish the objective of the present invention. The use of briquettes, such as stone briquettes, which are a common feature of many conventional grills, can also be used in carrying out the process of the present invention. The conventional grill 10 also optionally includes a grill cover 22 and, at the bottom of the grill, a grease collector 24 and an air vent 26.

Various methods for controlling the temperatures of the process may be used. For example, conventional fans, airflow condensers and countercurrent steam separation can be used with the present process and grill apparatus. The conventional grill shown in FIG. 1 also includes an air flow condensor 18 and blower 20, which are optional features. While these variations may improve the performance of the present invention, they are not considered necessary to meet the objectives of the invention. Changing the distances between the heating source, the fractionating medium and the grilling surface can also be used as a simple means of controlling the temperature.

The present invention may also have application in the production of smoke flavors and in smoke houses to reduce the known and potential carcinogens in such smokes. In such applications, in addition to the fractionating mediums mentioned above, the following columns may be used as the fractionating medium: jacketed columns, heat exchanger columns, bubble cap columns, seive plate columns, spiral columns, coiled columns, spinning band columns, vigreux columns and cold finger columns. In such applications, the food, which is in the food curing zone, is separated from the smoke-producing zone by the fractionating medium.

EXAMPLES

The Grill Apparatus

In order to demonstrate the effectiveness of the present inventive grilling process and grill apparatus, comparison tests using a conventional grill under the same cooking conditions were conducted. The inventive grill apparatus used for the comparative experiments contained the normal components of a gas grill. The bottom of the inventive grill was constructed from a standard grill and the upper sections were fabricated from stainless steel. In accordance with the invention, FIG. 1 illustrates a fractionating medium 28 attached on top of a stainless steel screen (unshown). The fractionating medium was packed tightly so that no voids existed between the individual pieces of packing or the sides of the grill and the packing. The folds of the packing were aligned so the packing had the maximum possible density and therefore maximum fractionation efficiency. Maximum density of the packing assures proper functioning and eliminates flames from the heating source from contacting the cooking area. The physical size of both the inventive grill and the conventional grill was 11 by 20 inches. The conventional grill was a propane grill (Sunbeam Model 20701), which was equivalent to the inventive grill in its size, burner BTU, and construction except for the fact that it was used as designed.

To ensure comparable operating temperatures, the grills were computer interfaced. A Cole-Parmer L-08109-25 15 bit A/D Computer Board with a Cole-Parmer L-08109-00 thermocouple amplifier was interfaced with an IBM compatible XT clone using Type K sealed thermocouples. The grills were set at three different temperatures—low, medium and high. Although the grills had a fan mechanism along with an airflow condenser to control the length of cooking, these features were not used because of the physical performance of the grill.

The fractionating medium used in the inventive grill was a York-Twist packing, style number 779, manufactured by Otto H. York Company, Inc. of Fairfield, N.J. This metallic packing is sold as a high efficiency mass transfer tower packing for a wide variety of distillation, absorption and scrubbing applications. The packing is constructed of multiple strands of fine metallic wire filaments that are knitted or woven together. The packing is woven and then crimped into a rippled metal cloth which has ripples alternating every ¼". The ripples were aligned in installing the packing of the inventive grill so the packing would have the maximum possible density. The packing cloth was 3/16" thick. Ten pieces of packing were used, and the thickness or depth of the packing was slightly less than 2 inches.

Food Preparation and Cooking

For the comparative experiments, the time and temperatures of cooking were varied. In all, eighteen different variations were employed. Preparation procedures involved using samples of a low fat ground beef molded into 80 gram patties (100 mm × 15 mm) 60 gram chicken legs (approximate mean weights). Chicken and beef were used as the food products because, according to the work by Uyeta et al., 1978, Studies on Mutagenicity of Food, *J. Food Hyg. Soc. Jpn.* 19:216-223 who tested 50 different food products, meat products, especially chicken and beef products, produce the highest quantity of known and potential carcinogens.

Taste Panel or Sensory Testing

To determine the consumer acceptance of the food products, such as the flavor and organoleptic properties, taste panels were conducted. For these sensory evaluations, the foods were prepared, as described above, 60 minutes in advance of all sensory evaluations. Each food sample was reheated prior to testing for 30 seconds on high power in a Spacemaker II, General Electric counter-top microwave oven. Each time and temperature variation was conducted in triplicate whereby four samples of ground beef or chicken were presented to twelve individuals. The samples were presented on a coded paper plate with a glass of water, a plastic fork and a napkin.

At each evaluation, panelists received four cooked and reheated ground beef patties or chicken legs prepared from one of four treatment procedures. Selection of the meats for individual panelists, order of presentation, and code numbers were random. Samples were evaluated for eight quality attributes—crust color, contour or shape, interior color, cell structure, moistness, tenderness, smokiness and flavor. These parameters were ranked from 1 to 9 with 1 being the worst score and 9 being the best of attributes. Prior to taking regular panel data, practice panel sessions were conducted.

Analyses of variance were performed on the subjective data with the use of the Minitabs statistical package (Minitab Inc. State College, Pa.). As appropriate, chisquare values were determined using the mean scores each preference item.

Mutagenicity Testing for Carcinogenicity

To measure the presence and amount of known and potential carcinogens in the tested foods (and hence to determine whether the invention herein reduces the amount of such carcinogens compared to conventional grilling), conventional bioassay and chemical analyses were conducted.

Because several studies by McCann et al., Detection of Carcinogens as Mutagens in Salmonella Microsome Test: Assay of 300 Chemicals, *Proc. Natl. Acad. Sci. U.S.*, 72:5135-5139 (1975) and 73:950-954 (1976), found a close relationship between carcinogenicity and mutagenicity, a Salmonella mutagen screening test, frequently called the Ames test, was used as a screening method for determining the presence and relative amount of carcinogenic compounds in the prepared food products.

After cooking, sample preparation was conducted using the basic extraction method of Commoner as modified by Fenton et al. Commoner, B., et al., 1978, Formatmort of Mutagens in Beef and Beef Extract During Cooking, *Science* 201:913; Felton J.S. et al., 1981 Mutagens From the Cooking of Food: Fractions from Cooked Ground Beef, *Mutatation Res.* 88:33-44. With this method, both hamburgers and chicken legs were used. The cooked meat was weighed, blended with 250 ml of acetone in a Waring blender for 3 minutes, filtered using a sharkskin filter, covered and frozen overnight (at least 18 in a freezer at $-20°$ C. Each sample was filtered again cold to remove protein components. The liltrate was concentrated to near dryness with a nitrogen purge, diluted to 150 ml. with 0.1 N HCl, and 10 ml. of saturated sodium chloride was added. The liltrate was then extracted twice with 100 ml. of methylene chloride (MeCl) and the MeCl was discarded. The pH was adjusted to 12 with sodium hydroxide and extracted twice with 100 ml of MeCl to get a basic fraction. The MeCl extract was dried under nitrogen purge and dissolved in 2 ml. of DMSO. The extract was tested for mutagenicity with Salmonella testing strain TA98 according to the plate incorporation method of Marom & Ames, 1983, Revised Methods for the Salmonella Mutagenicity Test, *Mutation Research*, 113:173-215.

All plate incorporation tests were run in duplicate and each experiment was repeated three times. The petri plates contained 25 ml Vogel Bonner medium E in 1.5% Bacto-Difco agar supplemented with 0.5% glucose and 12.5 moles of d-Biotin per liter. Top agar was prepared by adding 10 ml. of 0.5 mM 1-hitidine- 0.5 mN d-biotin solution. A 2 . 5 ml aliquot of 20% glucose solution and 2.0 ml. of 50×Vogel-Bonner salts to 100 ml. of agar (0.6%) was used. Cultures of TA 100 were obtained and grown in nutrient broth to a density of approximately $10^9$ cells per ml. One tenth ml. of culture was added to 2.0 ml. of top agar, followed by the test chemical freshly diluted with DMSO, and by 0.5 ml. of Liver S9 mix. The Liver S9 was purchased as lyophilized preparation (Arocclor 1254 induced Sprague Dawley male rate live LS-9 supplied by Molecular Toxicology, Annapolis, Md.) and was kept frozen until needed. To an ampule was added 2 ml. of sterile water to rehydrate it. Otherwise it was made into a standard S9 mix of Maron & Ames (1983), Revised Methods for the Salmonella Mutagenicity Test, *Mutation Research,* 113:173–215. The control consisted of 0.1 ml. of DMSO per plate. The top agar tubes were poured onto minimal bottom agar plates. The plates were inverted and incubated for up to 72 hr. at 37° C. and scored for his+revertants. The presence of toxicity was noted by a decrease in size or number of microcolonies.

PAH Testing for Carcinogenicity

To determine the presence and amount of polyaromatic hydrocarbons, AOAC methodology (973.30) was used (AOAC, 1990). The procedure was performed by adding the sample of hamburger to a 500 ml boiling flask, adding 200 ml. absolute ethanol, 7 grams of potassium hydroxide and boiling chips. This mixture was refluxed for 2 hours. The digest was removed from the condenser into a 1:1 separatory funnel with rinsing and extracted twice with isooctane (100 ml.). Each isooctane extract was washed 4 times with 250 ml. of warm distilled water by gentle swirling, purified by a 60 gram Florisil column containing 50 grams of sodium sulfate and washed with 50 ml. of isooctane and then 125 ml. of benzene. The entire eluate was combined and 2 ml. of hexadecane added, evaporated under nitrogen and 200 ml. of isooctane was added. The extract was washed with 100 ml. of phosphoric acid twice. DMSO (50) ml. was added and the DMSO layer partitioned, extracted with 300 ml. of distilled water and 50 ml. of isooctane. The extract was washed twice with two 25 ml. portions of isooctane and reduced to 1 ml. volume for use in thin layer chromatography, gas-liquid chromatography and high pressure liquid chromatography.

Thin layer chromatography was performed on samples using DMF-ether (20–80) to develop on a cellulose plate. Visualization by ultraviolet light (longwave) did not show any PAHs in any samples.

The samples were also subjected to gas-liquid chromatography separation using a $\frac{1}{8}''$ stainless steel column 10 ft. long and containing 3% OV-17 on Supelcosuport and using a flame ionization detector on a Shimaztu 9A gas chromatograph. The temperature for analysis was isothermal at 260° C. Chromatography of non-pyrene PAHs was conducted using a 0.25 mm ID, 30 meter carbowax 20M fused silica capillary column. The temperature program used for the separations was as follows: 60° C./5 min., 5° C./min. temperature elevation to a temperature of 230° C. for 10 min.

High pressure liquid chromatography was also used. The samples, as prepared above, were separated on a Econocap (St. Regis) C18 column using 60% Methanol/40% water isocratically as the liquid phase on a Waters 6000A HPLC pump and a Waters 440 fixed wavelength detector. The polyaromatic hydrocarbons were determined using a flow rate of 0.5 ml./min. using the UV detector set to 254 run. GLC was used to obtain data in Table 5.

Analysis of Data

A. Cooking Temperatures

The performance and safety of the inventive grill was considered to be better than that of the conventional grill because the inventive grill did not flare up even when large amounts of fatty drippings were present. The conventional grill was also considerably hotter, as the cooking temperature at the grill surface after 35 minutes was 435° C. at the low setting and 595° C. at the high setting. The temperature of the briquettes for the conventional grill after 35 minutes was 449° C. at the low setting and 679° C. at the high setting. In comparison, the inventive grill apparatus, after 35 minutes, had a cooking temperature at the grill surface of 220° C. at the lowest setting and 320° C. at the highest setting. See Table 6 for other temperature data. Moreover, with the inventive grill, there was no direct flame contact with the food. Hence, charting did not occur.

B. Sensory Analysis

The beef and chicken products cooked over the inventive grill generally possessed desirable quality characteristics and had a recognizable normal smoky flavor. The results of these sensory analyses are shown on Tables 1 and 2.

The means scores for the crust color, contour and interior color of the hamburger products were Detter with the inventive grill. Moreover, when using the inventive grill, mean scores for cell structure, moistness and tenderness increased when the low temperature setting was used for a longer period of time. Smokiness was identified with the inventive grill more easily in products cooked either at a medium temperature with a short time or at a medium temperature for a longer time than at other settings. The highest degree of smokiness was identified in products cooked on the conventional grill using a high temperature and short time.

With the chicken legs, higher mean scores were recorded for many characteristics using either the low temperature with the conventional grill or the medium temperature with the inventive grill. With both the inventive and conventional grills, smokiness was reduced at the low temperature setting, regardless of time.

Significant quality differences were found with hamburg products cooked using the high or low temperature settings with variations in cooking time. The analysis of variance results indicated that preferences for five of the eight quality characteristics of the ground beef samples were different when using the conventional vs. the inventive grill on either a high or a low temperature setting. While some quality attributes were scored higher with the conventional grill, many characteristics were scored as high using the inventive grill.

The type of grill (conventional vs. inventive) and temperature setting (high vs. low) resulted in chicken legs with significantly different crust characteristics and smokiness. No significance was found for any of the other six characteristics of the chicken products. Additional multiple comparison tests of the data identified significance, between characteristics of beef patties cooked at specific temperature settings. Although the significant comparative temperatures were not identical for each quality attribute, an observable trend is noted whereby the crust, moisture, interior color, tenderness, and flavor were affected by changes in both temperature and cooking time regardless of the type of grill used.

Results of this taste panel work show consumer acceptance of products prepared by this new technology was as good as products prepared by conventionally grilling.

C. Mutagenicity Analysis

Using the procedures described above, a statistical difference between the mutagenicity (and hence carcinogenicity) of the inventive grill and the conventional grill was found. These results are shown in Tables 3 and 4. The data shows large increases in the mutagenicity of conventionally grilled products as compared with products prepared by the inventive grill. This increased mutagenicity is believed to be the result of four main problems associated with conventionally grilled products: the higher cooking temperature, direct flame contact, charring and drying during cooking.

When temperature and time were evaluated as design factors, a correlation was found. As the temperature increased, the mutagenicity of the samples increased as would be expected. The same effect was not evident for the factor time due to the experimental design.

With the chicken legs, the experiments also showed that the inventive grill was safer than the conventional grill. As temperature is increased, the number of revertants increase.

The conclusion drawn from the mutagenicity assays was that the inventive grill was superior to a conventional grill. Such an advance means that a person need not give up the typical grilled product appearance and organoleptic quality to reduce their cancer risk.

D. PAH Analysis

Using the AOAC procedure for polyaromatic hydrocarbons using thin layer chromatography, none were detected for any of the hamburger treatments. Because another compound was co-chromatographing with benzo(a)pyrene, the results using gas-liquid chromatography for this compound were also unreliable. The results, nevertheless, confirm that the packing was working to remove high boiling point compounds at the medium heat setting. At the high heat setting, however, they were not removed as well as at lower temperature settings. The only polyaromatic hydrocarbon compound that was detected in the hamburg prepared with the inventive grill was acenaphtylene, which has a boiling point of 279° C. See the results shown in Table 5. Three other compounds, acenaphthene, fluorene and anthracene, which having boiling points of 280° C., 298° C. and 340° C., respectively, were below detection limits in the hamburg product prepared with the inventive grill.

The HPLC results showed the existence of a 2-5 ppb benzopyrene in the hamburg prepared by the conventional grill and no measurable benzopyrene when using the inventive grill.

These results demonstrate that benzopyrene and other very high boiling point carcinogens are not a problem when using the inventive grill and process.

Conclusions

The inventive grill and process performed well, resulting in a significant reduction of the amount of known and potential carcinogenic compounds compared with foods prepared by conventional grilling. Taste panel results of the foods prepared in the inventive grill were as good as those from foods prepared by the conventional grill.

The experiments proved that with the inventive grilling process and inventive grill it is possible to prepare safer grilled foods without sacrificing their organoleptic qualities.

TABLE 1

| | | Means and Standard Deviations of Sensory Analysis of Hamburg | | | | | | | |
|---|---|---|---|---|---|---|---|---|---|
| | | Quality Attributes | | | | | | | |
| Grills and Settings | | Crust Color | Contour/ Shape | Interior Color | Cell Structure | Moistness | Tenderness | Smokiness | Flavor |
| Control Grill | | | | | | | | | |
| High Temp. | Mean | 5.07 | 6.14 | 5.41 | 5.73 | 4.50 | 4.95 | 6.19 | 4.95 |
| 5/3* | Std. Dev. | 2.32 | 1.52 | 1.61 | 1.84 | 1.54 | 1.94 | 2.52 | 2.06 |
| High Temp. | Mean | 4.31 | 6.46 | 4.83 | 5.33 | 3.76 | 4.84 | — | 4.59 |
| 5/4 | Std. Dev. | 2.13 | 1.44 | 1.65 | 1.67 | 1.62 | 1.72 | — | 2.15 |
| Inventive Grill | | | | | | | | | |
| High Temp. | Mean | 5.80 | 6.43 | 5.46 | 5.79 | 5.44 | 5.84 | — | 5.56 |
| 10/6 | Std. Dev. | 1.95 | 1.24 | 1.27 | 1.19 | 1.65 | 1.57 | — | 1.87 |
| Medium Temp. | Mean | 4.56 | 5.88 | 5.50 | 6.12 | 6.24 | 6.45 | 4.89 | 5.87 |
| 6/4 | Std. Dev | 1.93 | 1.55 | 1.54 | 1.62 | 1.28 | 1.53 | 2.01 | 1.22 |
| Medium Temp. | Mean | 5.23 | 5.90 | 5.33 | 5.78 | 4.99 | 5.45 | 5.32 | 5.34 |
| 12/4 | Std. Dev. | 2.20 | 1.79 | 2.10 | 2.18 | 1.76 | 1.84 | 2.27 | 1.70 |
| Low Temp. | Mean | 4.50 | 6.12 | 6.20 | 6.15 | 6.89 | 6.75 | 3.04 | 5.06 |
| 11/5 | Std. Dev. | 2.46 | 1.98 | 2.60 | 2.23 | 2.44 | 2.35 | 2.50 | 2.53 |
| Low Temp. | Mean | 5.74 | 6.09 | 5.82 | 6.12 | 6.39 | 6.38 | 4.44 | 5.77 |
| 6/4 | Std. Dev. | 1.81 | 1.78 | 1.70 | 1.47 | 1.43 | 1.54 | 2.50 | 1.59 |

*Indicates cooking time (in minutes) on one side and cooking time (in minutes) on second side.

TABLE 2

| | | Means and Standard Deviations of Sensory Analysis of Chicken Legs | | | | | | | |
|---|---|---|---|---|---|---|---|---|---|
| | | Quality Attributes | | | | | | | |
| Grills and Settings | | Crust Color | Contour/ Shape | Interior Color | Cell Structure | Moistness | Tenderness | Smokiness | Flavor |
| Control Grill | | | | | | | | | |
| Medium Temp. | Mean | 5.24 | 6.05 | 5.66 | 6.74 | 5.03 | 5.22 | 5.86 | 5.34 |
| 15/10* | Std. Dev. | 2.86 | 1.79 | 2.14 | 1.56 | 2.05 | 2.33 | 2.44 | 2.17 |
| Low Temp. | Mean | 6.42 | 6.62 | 5.37 | 6.94 | 6.11 | 6.33 | 4.69 | 5.53 |
| 15/10 | Std. Dev. | 1.84 | 1.63 | 2.10 | 0.80 | 1.74 | 1.45 | 2.57 | 2.01 |
| Inventive Grill | | | | | | | | | |

TABLE 2-continued

Means and Standard Deviations of Sensory Analysis of Chicken Legs

| Grills and Settings | | Crust Color | Contour/ Shape | Interior Color | Cell Structure | Moistness | Tenderness | Smokiness | Flavor |
|---|---|---|---|---|---|---|---|---|---|
| Medium temp. | Mean | 6.11 | 6.50 | 6.64 | 7.16 | 6.24 | 6.22 | 5.00 | 6.32 |
| 15/10 | Std. Dev. | 1.79 | 1.44 | 1.79 | 0.69 | 1.83 | 1.84 | 2.43 | 1.93 |
| Low Temp. | Mean | 1.80 | 6.23 | 5.51 | 6.89 | 5.92 | 5.61 | 2.40 | 4.94 |
| 15/10 | Std. Dev. | 1.16 | 1.95 | 2.54 | 1.59 | 2.12 | 2.45 | 1.75 | 2.04 |

*Indicates cooking time (in minutes) on one side and cooking time (in minutes) on second side.

TABLE 3

Effect of Grilling Method and Hamburger Cooking Parameters on Ames Test

| Grill Treatment | Temp. | Time | 0.1 ml. Control | 0.1 ml. S9 | 0.05 ml. Control | 0.05 ml. S9 | 0.025 ml. Control | 0.025 ml. S9 |
|---|---|---|---|---|---|---|---|---|
| 1. Control | Low | 6/4 | 11.2 | 134.2b* | 13.2 | 87.7b | 9.5 | 47.5b |
| 2. Control | High | 4/4 | 5.6 | 285.0c | 5.5 | 185.cd | 4.8 | 89.8c |
| 3. Control | High | 6/4 | 3.2 | 198.3b | 4.2 | 134.3bc | 4.5 | 88.7c |
| 4. Control | Med. | 6/4 | 4.0 | 442.3d | 5.5 | 284.8d | 7.0 | 153.2d |
| 5. Control | Med. | 4/4 | 5.5 | 154.2b | 2.2 | 96.8b | 2.7 | 65.3bc |
| 6. Control | Low | 12/4 | 8.8 | 323.3c | 7.3 | 164.7bc | 11.5 | 77.7abc |
| 7. Inventive | Low | 6/4 | 17.5 | 30.0a | 15.8 | 37.7a | 18.8 | 40.7ab |
| 8. Inventive | Low | 9/4 | 16.5 | 28.2a | 16.5 | 31.5a | 17.3 | 28.5a |
| 9. Inventive | Low | 12/4 | 14.0 | 29.5a | 20.1 | 30.8a | 22.3 | 26.4a |
| 10. Inventive | Low | 14/6 | 13.1 | 30.4a | 12.0 | 25.6a | 11.6 | 24.8a |
| 11. Inventive | Med. | 5/3 | 8.8 | 31.7a | 14.5 | 34.3a | 16.2 | 29.5a |
| 12. Inventive | Med. | 6/4 | 13.0 | 33.3a | 14.0 | 30.8a | 16.2 | 26.0a |
| 13. Inventive | Med. | 9/4 | 5.7 | 24.2a | 6.7 | 18.5a | 7.7 | 17.5a |
| 14. Inventive | Med. | 12/4 | 8.7 | 28.8a | 11.7 | 27.2a | 10.5 | 24.8a |
| 15. Inventive | High | 6/4 | 13.3 | 27.0a | 17.0 | 27.3a | 14.3 | 24.3a |
| 16. Inventive | High | 12/4 | 6.5 | 38.0a | 4.5 | 28.3a | 6.5 | 26.8a |

*Significance at 0.05 level by Duncan's Multiple Range Test.

TABLE 4

Effect of Chicken Grilling on the Ames Test

| Grill Treatment | Temp. | Time | 0.1 ml. Control | 0.1 ml. S9 | 0.05 ml. Control | 0.05 ml. S9 | 0.025 ml. Control | 0.025 ml. S9 |
|---|---|---|---|---|---|---|---|---|
| A. Inventive | Low | 15/10 | 31.5 | 25.8a* | 24.3 | 28.5a | 38.8 | 27.3a |
| B. Inventive | Med | 15/10 | 22.0 | 35.3a | 25.3 | 41.0a | 21.3 | 25.7a |
| C. Control | Low | 15/10 | 15.8 | 148.0b | 13.1 | 82.3b | 18.3 | 67.0b |
| D. Control | Med | 15/10 | 14.3 | 409.8c | 12.8 | 258.0c | 21.5 | 184.5c |

*Significance at 0.05 level by Duncan's Multiple Range Test.

TABLE 5

Comparison of Minor PAH Components in Hamburger

| Grill | Temp. | Time | Acenaphthylene | Acenaphthene | Flourene | Anthracene |
|---|---|---|---|---|---|---|
| Control | Med. | (12/6) | 670 ppb | 980 ppb | 710 ppb | 980 ppb |
| Inventive | Med. | (12/6) | 5.4 ppb | <.6 ppb | <.6 ppb | <2 ppb |

TABLE 6

Temperature of Conventional and Inventive Grills After 35 Minutes

| Grill | Heat Setting | Briquette Temperature | Bottom Packing Temperature | Top Packing Temperature | Cooking Area Temperature |
|---|---|---|---|---|---|
| Conventional | Low | 449° C. | Not Present | Not Present | 435° C. |
| Conventional | Medium | 561° C. | Not Present | Not Present | 511° C. |
| Conventional | High | 679° C. | Not Present | Not Present | 595° C. |
| Inventive | Low | 374° C. | 376° C. | 268° C. | 220° C. |
| Inventive | Medium | 410° C. | 420° C. | 300° C. | 265° C. |
| Inventive | High | 518° C. | 507° C. | 352° C. | 320° C. |

The invention is not limited except as set forth in the following claims.

I claim:

1. A grill apparatus comprising:
(a) a grill for supporting food,
(b) a heating source, and
(c) a fractionating medium located below said grill and above said heating source, wherein said fractionating medium (i) prevents flames from said heating source from contacting said grill, (ii) allows drippings from the food supported on said grill to pass through said fractionating medium, contact said heating source and produce smoke compounds, and (iii) separates said smoke compounds on the basis of boiling point.

2. A grill apparatus as defined in claim 1 wherein said fractionating medium is selected from the group consisting of woven wire mesh packing, mesh packing, fiber bed packing, vertical flow sheet packing, metal ring packing, shaped packing, heli grid packing, inclined film packing, raschig ring packing, ellipsoids packing, berl saddles, prym rings and perforated plates.

3. A grill apparatus as defined in claim 1 wherein said fractionating medium is (i) separates lower boiling point smoke compounds from higher boiling point smoke compounds, (ii) allows said lower boiling point smoke compounds to contact the food supported on the grill, and (iii) retains said higher boiling point smoke compounds and thereby preventing them from contacting said food.

4. A grill apparatus comprising:
 (a) a grill for supporting food,
 (b) a heating source, and
 (c) fractionating medium means, located below said grill and above said heating source, for (i) preventing flames from said heating source from contacting said grill, (ii) allowing drippings from the food supported on said grill to pass through said fractionating medium means, contact said heating source and produce smoke compounds, and (iii) separating said smoke compounds on the basis of boiling point.

5. A grill apparatus according to claim 4, wherein said fractionating medium means is selected from the group consisting of woven wire mesh packing, mesh packing, fiber bed packing, vertical flow sheet packing, metal ring packing, shaped packing, heli grid packing, inclined film packing, raschig ring packing, ellipsoids packing, berl saddles, prym rings and perforated plates.

6. A grill apparatus according to claim 4, wherein said fractionating medium means also functions to (i) separate lower boiling point smoke compounds from higher boiling point smoke compounds, (ii) allow said lower boiling point smoke compounds to contact the food supported on the grill, and (iii) retain said higher boiling point smoke compounds and thereby preventing them from contacting said food.

7. A grill apparatus comprising:
 (a) a grill for supporting food,
 (b) a heating source, and
 (c) a multi-layer fractionating medium, located below said grill and above said heating source, wherein said fractionating medium (i) prevents flames from said heating source from contacting said grill, (ii) allows drippings from the food supported on said grill to pass through said fractionating medium, contact said heating source and produce smoke compounds, and (iii) separates said smoke compounds on the basis of boiling point.

8. A grill apparatus according to claim 7, wherein said multi-layer fractionating medium is selected from the group consisting of woven wire mesh packing, mesh packing, fiber bed packing, vertical flow sheet packing, metal ring packing, shaped packing, heli grid packing, inclined film packing, raschig ring packing, ellipsoids packing, berl saddles, prym rings and perforated plates.

9. A grill apparatus according to claim 7, wherein said multi-layer fractionating medium (i) separates lower boiling point smoke compounds from higher boiling point smoke compounds, (ii) allows said lower boiling point smoke compounds to contact the food supported on the grill, and (iii) retains said higher boiling point smoke compounds and thereby preventing them from contacting said food.

* * * * *